Patented Mar. 8, 1949

2,463,541

UNITED STATES PATENT OFFICE 2,463,541

HALOPHENYL ACETALS

Alva L. Houk, Philadelphia, Pa., assignor to Röhm & Haas Company, Philadelphia, Pa., a corporation of Delaware No Drawing. Application May 3, 1945, Serial No. 591,834

8 Claims. (Cl. 260—613)

1

This invention relates to halophenyl acetals having the formula

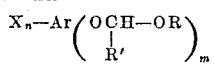

wherein X represents at least one halogen selected from chlorine and bromine, $n$ represents an integer of at least five, R' represents hydrogen or the methyl group, R represents a non-tertiary hydrocarbon group of at least four carbon atoms, Ar represents an aryl nucleus of the benzene series, and $m$ represents an integer from one to two.

The compounds of this invention are useful as parasiticidal agents, being effective mildewproofing agents and having marked fungicidal and bactericidal properties. They may be applied, for example, to textiles to protect them from attack by fungi and micro-organisms generally under severe conditions of leaching and exposure. They have marked resistance to photochemical change and lack the irritation of their parent ring compounds. Their solubility in organic liquids permits their incorporation in varnishes, enamels, lacquers, and paints, and yet they retain their parasiticidal activity.

The pentahalophenyl acetals of the above formula may be prepared by reacting an alkali metal salt of a halogenated phenol with an α-haloalkyl ether. The reaction is desirably carried out in an organic solvent such as a ketone, an ester, or a hydrocarbon, methyl ethyl ketone, methyl isobutyl ketone, ethyl acetate, benzene, toluene, a low-boiling naphtha being typical examples of suitable solvents. The reaction occurs in many cases at room temperature, particularly when a salt is precipitated in the reaction, but may be accelerated by heating. The reaction may be completed by heating under reflux. The salt formed may then be separated, often by filtering, the solvent removed if desired, and the reaction product worked up as desired. The products vary from oils to well-defined crystalline materials.

As a halophenol, there may be used pentachlorophenol, pentabromophenol, or chlorobromophenols, such as 2,4,6-trichloro-3,5-dibromophenol, 2,2'-dihydroxy-3,3',5',6,6'-pentachlorodiphenyl methane, 2,2'-dihydroxy-3,3',5,5',6,6'-hexachlorodiphenyl methane, 2,2'-dihydroxy-3,3',5,5',6,6'-hexachlorodiphenyl sulfone, and the like. These phenols are used in the form of a salt of an alkali metal.

The α-haloalkyl ether may be prepared from any non-tertiary alcohol, that is, a primary or secondary alcohol, having at least four carbon

2 atoms, by reaction with formaldehyde or acetaldehyde and a hydrogen halide, such as hydrogen chloride or hydrogen bromide. Typical of the alcohols which may be used are butyl, isobutyl, amyl, sec.-amyl, hexyl, heptyl, octyl, iso-octyl, 2-ethyl hexyl, capryl, decyl, dodecyl, cetyl, octadecyl, oleyl, undecenyl, cyclohexyl, methylcyclohexyl, benzyl, methylbenzyl, tert.-butylbenzyl, dihydronordicyclopentadienyl, or other acyclic or cyclic non-tertiary alcohol, particularly those of four to eighteen carbon atoms.

The preparation of typical halophenyl acetals is illustrated in the following examples. Parts are by weight.

Example 1

To a solution of 72 parts of sodium pentachlorophenate in 300 parts of methyl isobutyl ketone at about 40° to 50° C., there was added slowly 60 parts of dodecyl chloromethyl ether. The mixture was stirred for an hour at 50° C. The reaction mixture was then cooled and filtered to remove the salt which had formed. The solvent was removed by warming under reduced pressure, about 110 parts of a light amber-colored liquid remaining. Crystals were obtained, melting at 35°–40° C., when this oil was taken up in a little acetone. The oil comprised chiefly pentachlorophenyl dodecyl formal.

A 1% solution of the oil was made in petroleum ether and various types of fabrics were passed through it and squeezed free of excess. The impregnated fabrics were then dried. Samples of each were submitted to mildew tests in nutrient agar media which were inoculated with spores of such organisms as Metarrhizium glutinosum and Aspergillus niger and incubated for a week at 30° C. No growth resulted. The tested fabrics retained their tensile strength.

Other impregnated samples were placed in running water for twenty-four hours before being subjected to the same type of test. No visible growth occurred in any test, and there was no appreciable loss of strength in any case.

Example 2

To a solution of 72 parts of sodium pentachlorophenate in 300 parts of methyl isobutyl ketone, there was added 48 parts of capryl chloromethyl ether. The term "capryl" here refers to the secondary alkyl group,

a radical derived from the secondary octyl alcohol, octanol-2. The mixture was stirred for over two hours at approximately room temperature. The salt which had formed during this time was filtered off and the mixture heated under reduced pressure. There remained about 82 parts of a light red liquid, which comprised chiefly pentachlorophenyl capryl formal.

This liquid was used at 1% concentration in petroleum ether for the impregnation of cotton sheeting and muslin. The dried impregnated cloth was tested as described above. In all tests, the treated samples of cloth inhibited growth of organisms thereon and retained their strength. Upon repetition of the tests with pieces leached twenty-four hours in running water, the leached samples were quite as resistant to mildewing or the growth of fungi in nutrient media as the unleached samples.

*Example 3*

To a solution of 144 parts of sodium pentachlorophenate in 500 parts of ethyl acetate at 50° C., there was added 146 parts of cetyl chloromethyl ether. The mixture was stirred for an hour with its temperature maintained at about 50° C. The salt which had formed was filtered off. When the filtrate became cool, crystals separated, melting at 38°–42° C. and corresponding in composition to pentachlorophenyl cetyl formal.

Tests on cotton cloth, performed as described above, proved that this product inhibited growth in both unleached and leached pieces of cloth and that the strength of the cloth was retained.

*Example 4*

To a solution of 57 parts of sodium pentachlorophenate in 200 parts of dry benzene, cooled to 10° to 15° C., there was slowly added 25 parts of n-butyl chloromethyl ether. The mixture was stirred for two hours at room temperature and then for three hours at 40° C. The salt was filtered off and the filtrate concentrated. A reddish liquid was obtained, which consisted chiefly of pentachlorophenyl butyl formal.

This product was also tested for its fungistatic effect and found to be highly efficient.

In place of the sodium pentachlorophenate used above, there may be substituted the pentabromophenate. The resulting acetals are also effective agents for preventing growth of organisms on fabrics.

*Example 5*

To a solution of 72 parts of sodium pentachlorophenate in 200 parts of methanol, there was added 41 parts of benzyl chloromethyl ether. The mixture was stirred for two hours and then poured into 600 parts of water to separate the salt and solvent, and an oil was obtained. The oil was taken up in benzene. Upon evaporation of the benzene a solid was obtained, melting at 54° to 62° C. and having a composition corresponding to pentachlorophenyl benzyl formal.

This product was also tested on cotton cloth against such organisms as *Chaetomium globosum*, *Metarrhizium glutinosum*, and *Aspergillus niger*. It was effective in all cases in inhibiting growth and was not leached out, permtting retention of tensile strength.

Samples of pentachlorophenol tested in the same way allow a copious growth of organisms on leached samples with complete loss of strength.

*Example 6*

To a mixture of 142 parts of 2,4,6-trichloro-3,5-dibromophenol and 300 parts of benzene, there was added 16 parts of powdered sodium hydroxide. Then there was stirred in 98 parts of dodecyl chloromethyl ether. The resulting mixture was stirred for two hours at 50° C. and then for one hour at 65° C., and the salt, amounting to 21 parts, was filtered off. The solvent was then removed by heating on the steam bath under reduced pressure. A reddish liquid remained which approximated in composition the trichlorodibromophenyl dodecyl formal.

This compound, like all the preceding ones, effectively inhibits the growth of organisms on fabrics, even in the presence of a culture medium under incubating conditions.

*Example 7*

To a solution of 58 parts of sodium pentachlorophenate in 150 parts of methyl isobutyl ketone, there was added 82 parts of dodecyl α-chloroethyl ether (from dodecyl alcohol, acetaldehyde, and hydrogen chloride). The mixture was stirred for two hours at room temperature and for one hour at 60° C. Salt was then removed and the solvent removed under reduced pressure. There remained 126 parts of a dark-colored liquid, which had highly effective action as a mildewproofing agent.

Acetals may likewise be prepared from other α-haloethyl ethers and the same or other halophenols having at least five chlorine or bromine atoms per molecule. The dihydroxy polyhalo diphenyl methanes and sulfones may be mentioned as yielding products which resemble those already described. On a weight and cost basis, however, there are preferred compounds of the formula

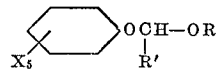

and of these the most readily prepared are those in which R' is hydrogen and those in which R is an aliphatic hydrocarbon group of four to eighteen carbon atoms.

I claim:

1. A compound of the formula

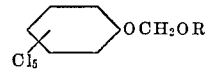

wherein R represents an aliphatic hydrocarbon group of four to eighteen carbon atoms, R being joined to oxygen at a non-tertiary carbon atom thereof.

2. A compound of the formula

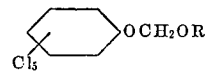

wherein R represents an alkyl group of four to eighteen carbon atoms, R being joined to oxygen at a primary carbon atom thereof.

3. A compound of the formula

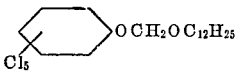

4. A compound of the farmula

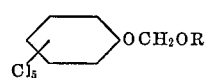

wherein R represents an alkyl group of four to eighteen carbon atoms, R being joined to oxygen at a secondary carbon atom thereof.

5. A compound of the formula

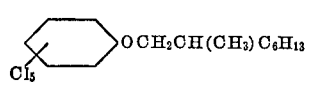

6. A compound of the formula

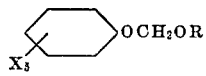

wherein X represents a halogen selected from the class consisting of chlorine and bromine and R represents a hydrocarbon group of four to eighteen carbon atoms selected from the class consisting of aliphatic, cycloaliphatic, and monocyclic arylmethylene groups, R being joined, at a non-tertiary carbon atom thereof, to the designated oxygen atom.

7. A compound of the formula

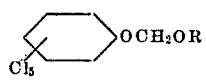

wherein R represents a monocyclic arylmethylene hydrocarbon group of not over eighteen carbon atoms.

8. A compound of the formula

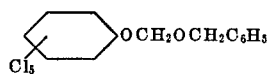

ALVA L. HOUK.

REFERENCES CITED

The following references are of record in the file of this patent:

UNITED STATES PATENTS

| Number | Name | Date |
|---|---|---|
| 2,205,393 | Coleman et al. | June 25, 1940 |
| 2,314,305 | Britton et al. | Mar. 16, 1943 |

OTHER REFERENCES

Birosel, Philippine Jour. Science, vol. 34, page 158.

Certificate of Correction

March 8, 1949.

Patent No. 2,463,541

ALVA L. HOUK

It is hereby certified that error appears in the printed specification of the above numbered patent requiring correction as follows:

Column 4, line 73, claim 5, for that portion of the formula reading "OCH₂CH" read *OCH₂OCH*; and that the said Letters Patent should be read with this correction therein that the same may conform to the record of the case in the Patent Office.

Signed and sealed this 9th day of August, A. D. 1949.

[SEAL]

THOMAS F. MURPHY,
*Assistant Commissioner of Patents.*